Oct. 27, 1959

T. T. TRUE 2,910,657

CRYSTAL FILTER

Filed Feb. 18, 1955

INVENTOR:
THOMAS T. TRUE,

BY Donald R. Timbie

HIS ATTORNEY.

United States Patent Office 2,910,657

Patented Oct. 27, 1959

2,910,657

CRYSTAL FILTER

Thomas T. True, North Syracuse, N.Y., assignor to General Electric Company, a corporation of New York Application February 18, 1955, Serial No. 489,120

10 Claims. (Cl. 333—72)

This invention relates to an improved crystal filter and in particular to a driving circuit for such a filter.

Previously known circuits for driving crystal filters have generally included a doubly-tuned magnetically-coupled transformer. As is well known by those skilled in the art, adjusting such a transformer for proper tuning and impedance matching is difficult. Furthermore, the amount of coupling provided by such a transformer is dependent to a large extent on the spacing between the primary and secondary windings. As the spacing of the windings is rather critical, the manufacture of such transformers is expensive.

Accordingly, it is an object of this invention to provide an improved crystal filter that is easy to adjust.

It is another object of this invention to provide an improved crystal filter that does not require close manufacturing tolerances.

It is another object of this invention to provide a driving circuit for a crystal filter that can be adjusted in such manner that there is a minimum of interaction between the various components of the circuit.

It is another object of the invention to provide a driving circuit or crystal filter having a single adjustment for matching and tuning.

It is another object of the invention to provide a crystal driving circuit having the above-mentioned advantages, as well as a good rejection for applied energy that could cause spurious resonances in the crystal.

It is another object of the invention to provide a crystal driving circuit in which the above objectives are obtained and at the same time to improve the efficiency of the energy transfer.

Another advantage of this crystal driving circuit is the fact that the same phase relationship exists between the input and output when the circuit is adjusted for maximum signal output.

Whereas this invention may be used in various environments, it has proven especially successful in separating the fundamental frequency from the bursts of color synchronizing information that are transmitted in accordance with the present color television standards. For reasons, which will subsequently be explained, this application of the crystal filter requires, for best operation, a crystal having special characteristics.

Briefly, the manner in which these objectives may be attained in accordance with the principles of this invention is as follows: A circuit that is resonant at the frequency to be passed by the filter is formed by an inductance connected in parallel with two other reactive impedances connected in series. Means are provided for producing currents in the inductance that correspond to the signal applied to the filter. A crystal and its terminating network are connected in series and the series combination thus formed is coupled in parallel with one of the serially connected reactive impedances.

The manner in which these above objectives may be obtained in accordance with the principles of this invention will be more clearly understood after the following discussion of the drawings in which.

Figure 1:
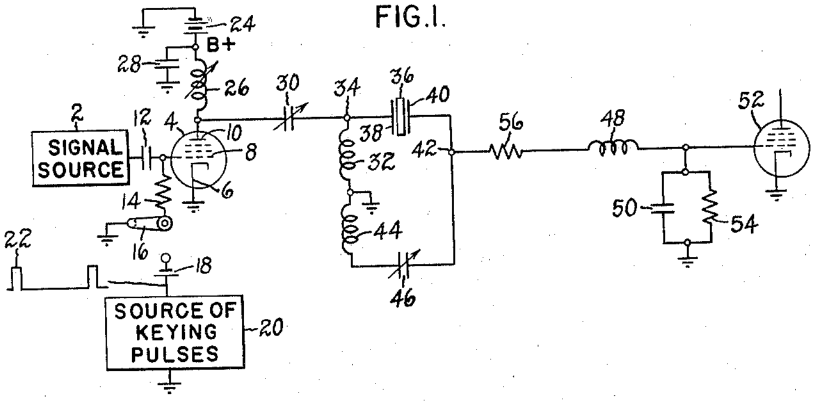
Figure 1 illustrates an embodiment of the invention wherein the impedance match is determined by a capacitance and an inductance, the output of the driving circuit appearing across the inductance.

In the embodiment of the invention shown in Figure 1, a signal source 2 may provide the separated bursts, each burst containing several cycles of a carrier wave or a composite video signal containing the bursts. The output of the signal source 2 is coupled to a control circuit of an electric valve 4 so as to control the amount of current flowing therein. Although various types of electric valves may be used, the particular one illustrated is a multi-grid vacuum tube having a cathode 6, a control electrode 8 and an anode 10. A coupling condenser 12 and a grid-leak resistor 14 couple signals from the source 2 to the control grid 8. In the event that the signals provided by the source 2 are separated bursts, the lower end of the grid-leak resistor 14 may be connected to ground via a switch 16 as shown. On the other hand, if the output of the signal source 2 is a composite video signal containing the bursts, the switch 16 will be moved into a vertical position and thereby connect the lower end of the grid-leak resistor to the negative terminal of a bias supply 18. The positive terminal of the bias supply 18 is connected to ground via a source 20 of keying pulses 22. These keying pulses occur only during the presence of the bursts in the composite video signal and have sufficient positive amplitude to overcome the cut-off bias placed on the grid 8 by the biasing source 18, thus permitting the current flowing from the cathode 6 to the anode 10 to be controlled by the bursts alone. In this event the electric valve 4 acts as a gating valve for separating the bursts from the rest of the composite signal.

The anode 10 of the electric valve 4 is connected to the positive terminal of a source 24 of direct-current electromotive force via an inductance 26, which may be variable as shown. If the impedance of the source 24 is considered to be too high for the frequencies of the cycles within the bursts, it may be bypassed in the usual fashion by a capacitor 28 connected between the positive terminal of the source 24 and ground. A series-circuit formed by capacitor 30, which may be variable, as shown, and an inductance 32 is connected between the anode 10 of the electric valve 4 and ground. It will be observed that the series-circuit formed by the capacitor 30 and the inductance 32 is effectively in parallel with the inductance 26 for signal frequencies, this parallel combination being connected between anode 10 and ground. The capacitor 30 may be adjusted so as to make the inductance 26 exhibit parallel resonance at the desired signal frequencies. The apparent impedance between ground and a point in-between the capacitor 30 and the inductance 32, such as 34, for example, is primarily determined by the ratio of the reactances of the capacitor 30 and the inductance 32.

A crystal 36 may be coupled to the above driving circuit in various ways. In this particular embodiment of the invention, the crystal is coupled in the following manner: The crystal 36 is contained within holders 38 and 40 and is connected between the point 34 and a terminal 42. As is well known to those skilled in the art, the holders 38 and 40 form a capacitor which may bypass undesired signal frequencies around the crystal 36. Signals passed around the crystal in this manner may, if desired, be neutralized in this particular circuit as follows: An inductance 44 and a variable capacitor 46 are connected in series between the grounded end of the inductance 32 and the terminal 42. The inductances 32 and 44 have unity coupling. This may be attained if they are bifilar windings. The value of the capacitor 46 is adjusted so that it is equal to the capacitance between the holders 38 and 40 because the voltage supplied to the holders is out of phase and equal to the voltage supplied to the condenser 46. These voltages arrive in an out-of-phase condition at the terminal 42 and therefore, neutralize one another. However, the signal frequencies passed by the crystal 36 are not neutralized and arrive at the terminal 42.

The bypassing effect of the holders 38 and 40 may be reduced by connecting an inductance between them, the inductance being of such value as to produce parallel resonance at signal frequencies with the capacitance between the holders. In this event, the inductance 44 and the capacitor 46 would be eliminated. Of course, no neutralizing may be required in some applications.

There are various ways for terminating the crystal, but in this particular example, it has been found advantageous to provide the termination by connecting a series-circuit comprised of an inductance 48 and a capacitor 50 in series between ground and the terminal 42. The values of the inductance 48 and the capacitor 50 are selected so as to provide series resonance at the desired signal frequencies. In this way a low output impedance is provided for the crystal 36. However, the voltages appearing across the capacitor 50 will have considerable amplitude and they may be coupled in any suitable manner to succeeding circuitry such as an amplifier 52. Some circuitry that may be coupled across the capacitor 50 in this manner might not require a D.-C. return path, but usually where the output across the crystal 36 is coupled to a grid of an amplifier, as shown, a D.-C. return path should be provided. This can be effected by placing a resistor 54 in parallel with the capacitor 50.

In some applications of crystal filters, it may be desirable to control the Q of the filter by means of external circuitry. In order to obtain such a result in the illustrated circuit, the crystal 36 is such as to have a Q that is higher than that required for the filter as a whole and the resistance may be inserted in the circuit for lowering the Q to the desired value. In order to obtain such a result in this particular circuit, a resistor 56 has been inserted in series with the inductance 48. However, the larger the resistance of the resistor 56, the greater is the attenuation of the desired signal frequencies and the less is the efficiency of the crystal filter. In this driving circuit, however, it will be observed that the resistance in the driving source is at a minimum and accordingly, that the control of the Q of the filter may be obtained by the resistor 56. In other words, if a driving circuit is used having a low effective resistance in series with the crystal, larger external resistors, such as 56, have to be used in order to lower the Q to a desired value. In some applications where the driving circuit has exceedingly high resistance in series with the crystal, the Q of the overall filter may be already too low. It will be seen that the arrangement illustrated in the drawing, while possessing many other advantages, also is capable of providing a crystal driving source having a low internal impedance and that this permits higher Qs to be obtained and also permits reduction of the overall Q of the filter by insertion of a series resistance such as resistor 56.

Figure 2:
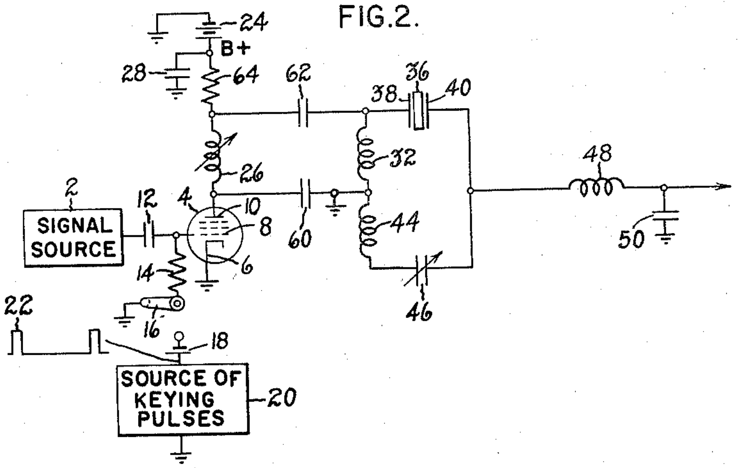
Figure 2 illustrates an embodiment of the invention wherein the impedance match is determined by two inductances.

In the circuit arrangement of Figure 2, components corresponding to components of Figure 1 are indicated by the same numerals. A capacitor 60 is connected between the anode 10 and ground and a coupling capacitor 62 is connected between the upper end of the inductance 26 and the upper end of the inductance 32. The size of the coupling capacitor 62 is sufficient so that its impedance is negligible and accordingly, from a point of view of signal frequencies, the inductances 26 and 32 may be said to be joined at their upper ends. The purpose of the capacitor 62 is to prevent the source 24 from being grounded through the inductance 32. Therefore, the capacitor 60 and the inductance 32 form a series-circuit which is effectively coupled in parallel relationship with the inductance 26. The values of the inductance 26, the capacitor 60 and the inductance 32 are selected so as to produce resonance at the desired signal frequency. If the upper end of the inductance 26 were connected directly to the junction of the capacitor 28 and the source 24, a short-circuit for the signal frequencies would exist between the upper end of the inductance 26 and ground. This would mean that the filter would have little or no output. In order to prevent this from happening, a resistor 64 or other suitable impedance may be connected in the upper end of the inductance 26 and the positive terminal of the source 24. In this circuit an apparent impedance presented to the crystal 36 will be determined by the ratio of the inductances 26 and 32 inasmuch as the impedance of the capacitor 62 can be neglected.

Figures 3, 4:
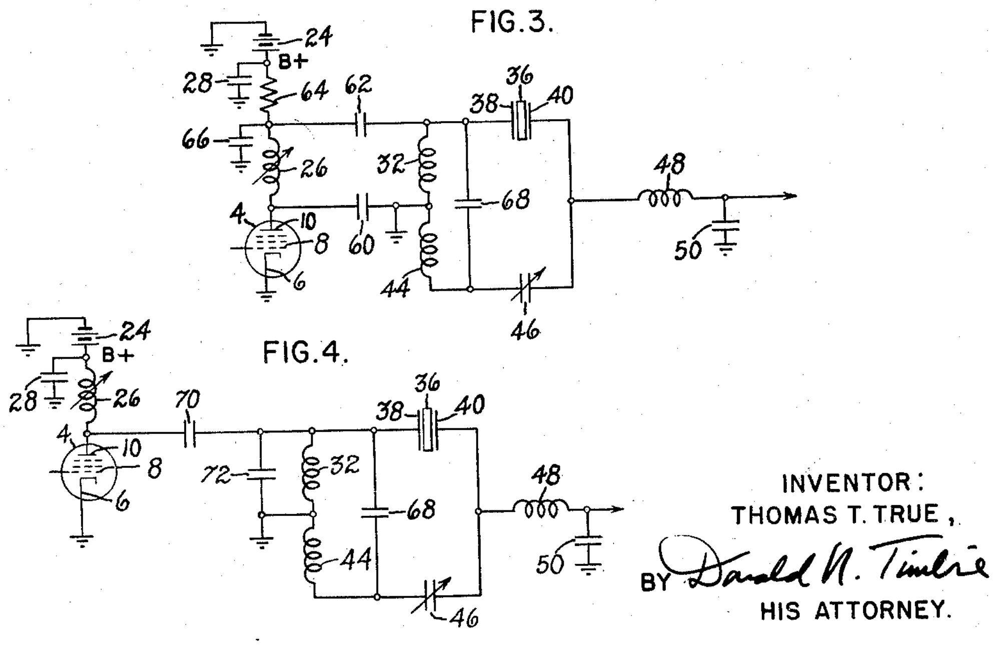
Figure 3 illustrates an embodiment of the invention wherein the impedance match is determined by an inductance and a capacitance, the output of the driving circuit appearing across the capacitance.
Figure 4 illustrates an embodiment of the invention wherein the impedance match is determined by two capacitances.

The circuit arrangement in Figure 3 is similar to that shown in Figure 2 and corresponding parts are indicated by the same numerals. The main difference between the two circuits is that the junction of the inductance 26 and the resistor 64 is connected to ground by an additional capacitor 66. The capacitor 60 and the capacitor 66 thus form a series-circuit which is connected in parallel with the inductance 26 and forms a resonant circuit therewith. The inductance 32 is made to appear as a relatively high resistive impedance by connecting between extremes of inductances 32 and 44 a capacitor 68 to produce parallel resonance at the desired signal frequency. As before, the capacitor 62 is only a blocking or coupling capacitor and, therefore, the impedance presented to the crystal 36 is determined by the ratio between the reactances of the inductance 26 and the capacitor 66. If neutralizing were not provided for, the inductances 44 and 32 and capacitors 46 and 68 could be eliminated.

The embodiment of the invention shown in Figure 4, is similar to the other embodiments and corresponding components will be indicated by the same numerals. This circuit is similar to that of Figure 1 in that the upper end of the inductance 26 is connected to the positive terminal of the direct-current electromotive force source 24. A capacitor 70 and a capacitor 72 are connected in series between the anode 10 and ground. Inasmuch as the positive terminal of the source 24 is usually bypassed to ground for signal frequencies by a capacitor such as 28, the series-circuit formed by the capacitors 70 and 72 is effectively coupled in parallel with the inductance 26. Once again the values of the inductance 26 and the capacitors 70 and 72 are selected so as to produce resonance at the desired signal frequencies. In a manner similar to that shown in Figure 3, the loading effects of inductances 32 and 44 are minimized by use of capacitor 68 in parallel with them, the capacitor 68 being such as to tune inductances 32 and 44 to parallel resonance at signal frequencies. Therefore, it can be seen that the impedance presented to the crystal 36 in the circuit of Figure 4 depends upon the ratio of the reactances of the capacitors 70 and 72. Without neutralization, the same components can be eliminated as were eliminated in Figure 3.

The following discussion relates to factors which should be considered in selecting crystals for use in the circuit just described under certain operating conditions. If the filter is to be used for producing a continuous reference wave from a series of repetitive bursts of several cycles of the desired reference wave, the following considerations are pertinent. As is well known to those skilled in the art, the bursts may be analyzed into a continuous wave of the reference frequency plus sidebands that are separated by the repetition frequency of the burst. The purpose of the crystal filter is to reduce these sidebands and to pass the continuous wave of the reference frequency. The amount of reduction in the sideband energies required depends upon the circuitry with which the filter is to be used. In general, the more rejection of the sideband energies in the accompanying circuit, the less reduction of these energies is required of the crystal filter.

The amplitude of the sideband energies varies symmetrically about the central frequency of the bursts in the well known $$\frac{\sin x}{x}$$

function. Generally speaking, the amplitude of the sideband energies decreases as the frequency of the sidebands departs from the central frequency of the bursts. As is well known to those skilled in the art, crystals have spurious responses at various frequencies above the frequency of their principal mode of operation. The presence of these spurious responses in the crystal would have little or no effect if they occurred at frequencies other than the frequencies of the sidebands of the bursts. However, in many cases, such as in a color television receiver wherein the burst repetition frequency is 15,750, the sidebands are relatively close together so that it becomes difficult to make crystals on a commercial production basis that have spurious responses occurring between the frequencies at which the sideband energies exist. Furthermore, even if such crystals are available, the spurious responses of the crystal shift in frequency with changes in ambient temperature to such an extent that they may well occur at the same frequency as one of the sidebands.

The effect of the presence of sideband energies at the output of the filter is to produce a reference wave that is amplitude modulated and phase modulated at a frequency equal to the difference between the frequencies of the sideband and the central frequency of the bursts. In color television receivers wherein the reference wave provided by the filter is used as a standard with which a phase and amplitude modulated color carrier is compared in order to derive color signals, phase and amplitude modulation in the reference wave itself produces errors in the color signals.

In accordance with a preferred embodiment of this invention, the amount of phase or amplitude variation appearing in the reference wave at the output of the filter previously described is reduced below a significant value and the effects of ambient temperature variation are reduced to a nullity. Of greater significance is the fact that it is not necessary to incur the additional expense of carefully selecting crystals having accurately positioned spurious responses. In the preferred embodiment a crystal is used which has negligible spurious response within a large number of cycles of main response frequency. The first spurious response occurs in a region where the sideband energies are extremely small so that if perchance the frequency of the sideband energy and the frequency of the spurious response coincides, only a small amount of sideband energy will appear at the output of the filter. Generally, the frequency at which the first spurious response occurs can be such that any small amount of sideband energy present will be completely rejected by the circuit to which the output of the crystal filter is applied. The exact location of the first spurious response is not critical and may vary to some degree with the particular application. For example, in using this circuit in color television receivers constructed so as to operate within signals transmitted in accordance with present standards, the first spurious response point occurs at about 290 kilocycles above the main response point of the crystal.

At present, crystals having these required characteristics may be produced by bevelling the upper and lower edges of the crystal. In general, the greater the amount of bevelling or "contouring" the less is the amplitude of spurious responses within a given frequency range above the main frequency of the crystal. Eventually, the amplitude of the spurious responses in this range decreases to the vanishing point. However, in general, as the spurious responses within the range decrease, one or more spurious responses outside the range increase in amplitude. In a particular application the latter spurious responses may be made to occur at such a high frequency as to be severely attenuated by the crystal filter circuitry or to lie outside of the response of the circuit coupled to the filter output.

The effect of contouring is generally the same regardless of the shape of the crystal. However, with rectangular crystals, the necessary amount of bevelling or contouring may not be achieved before the corners of the crystal are so thin as to fracture in normal use. For this reason, it is desirable to use a circular crystal. The technique of contouring is well understood by those skilled in the art and, therefore, requires no further discussion.

The extent to which such contouring should be carried can be more understood from the following analysis. Let $\phi$ represent the phase error that can be tolerated in the reference wave at its point of application. In a color television receiver the point of application would be the synchronous detector which compares the phase of the color carrier with the phase of the reference wave. It should be understood that the maximum phase error that can be tolerated between the color carrier and the reference wave depends on the degree of color distortion that can be tolerated, but in general, it seems that it should not be greater than 12 degrees. However, some of the error may be introduced in the transmitter or in parts of the receiver other than the crystal filter itself so that not all of the maximum phase error can be introduced in the crystal filter. At present, it seems that the maximum amount of phase error that can be permitted between the input of the crystal filter and the input of the synchronous detector should be about 5 degrees. A constant $A_c$ may indicate the ratio between the output of the crystal filter for an applied signal having a frequency above the frequency of the reference wave and the output of the filter for an applied signal of equal amplitude having the frequency of the reference wave. A constant $A_1$ may represent the same ratio for the circuitry between the output of the crystal filter and the point of application. The ratio between a sideband component of the wave applied to the crystal filter and the central frequency of the wave may be $$\frac{E_n^1}{E_0^1}$$

In general these factors are related as indicated by the following expression, $$\phi = \pm \sin^{-1}\left(\frac{E_n^1}{E_0^1} A_1 A_c\right)$$

For small angles this expression becomes $$\pm \frac{E_n^1}{E_0^1} A_1 A_c$$

In a given application of the crystal filter that is the subject of this invention, $\phi$ may be arbitrarily determined. For example, in a color television receiver constructed so as to operate in response to the presently standardized color television signals, the value of $\phi$ may be 5 degrees expressed as radians. The constant $A_1$ will also be known. Whereas the value of $A_c$ may be somewhat affected by the design of the circuit components used in the filter of this invention it will generally be found that the characteristics of the crystal itself are of far greater significance. At present, the best practical crystal that will yield the proper value of $A_c$ in a color television receiver is one that has been contoured. In order to be on the safe side, and to avoid the necessity of testing each crystal, it is preferable to assume the worst possible condition, i.e., if the highest amplitude sideband of the signal applied to the crystal filter occurs at the same frequency as the highest response of the crystal. The necessary calculation can be made by one skilled in the art. The minimum amount of contouring required to meet these conditions can be determined on a trial and error basis, but once determined all of the crystals contoured by this minimum amount will function properly in the crystal filter. In general, it will be found that satisfactory results are obtained if the contouring, or whatever other method may be employed, is such as to reduce all spurious responses of the crystal to a negligible amplitude for a frequency region within which the sidebands of the bursts have any appreciable amplitude. In a color television receiver, for example, wherein the bursts occur at line frequency rate of 15,750 a second and wherein the carrier wave frequency is approximately 3.58 megacycles, crystals having their first significant response at a frequency that is 250 kilocycles above the carrier frequency have been successful.

Although this invention may be used in a variety of applications, crystals having the following specifications have proven highly satisfactory when the crystal filter is used to extract a reference wave from a series of bursts transmitted in accordance with present color television standards. The flat central areas of the crystal range from 1/16 to 3/32 inch. The thickness of the crystal between these central planes is about 7 mils and the contouring or bevelling is such that the thickness of the edge of the crystal is not in excess of 10 mils. The diameter of the crystals is between 3/8 of an inch and 1/2 inch. If the edges are less than 4 mils, the crystal is likely to fracture in use. If the edge thickness is in excess of 6 mils, there is a detrimental increase in the effect of the crystal holder.

While I have illustrated a particular embodiment of my invention, it will of course be understood that I do not wish to be limited thereto since various modifications both in the circuit arrangement and in the instrumentalities may be made, and I contemplate by the appended claims to cover any such modifications as fall within the true spirit and scope of the invention.

What I claim is new and desire to secure by Letters Patent of the United States is:

1. A crystal filter circuit comprising, in combination, a first inductance, means for establishing one end of said inductance at ground potential for signal frequency, means for applying signals to the other end of said first inductance, a series-circuit comprised of a condenser and a second inductance, connections for connecting said series-circuit between said other end of said first inductance and ground, a crystal and a terminating circuit connected in series between ground and a point intermediate said condenser and said second inductance.

2. In a crystal filter, as described in claim 1, a third inductance closely coupled to said second inductance, one end of said third inductance connected to ground, and a condenser connected in series between the other end of said third inductance and a side of the crystal that is remote from said second inductance, said third inductance being wound as half of a bifilar coil, the other half being said first inductance, thus providing a neutralizing circuit for cancelling out the effects of energy bypassed around the crystal by the shunt capacitance of its holders.

3. In a crystal filter having a crystal and a terminating impedance connected in series, a driving circuit for applying desired signal frequencies to said crystal comprising, in combination, a first inductance, means for establishing one end of said inductance at ground potential for signal frequencies, means for applying signal frequency voltages to the other end of said first inductance, a series-circuit having a condenser and a second inductance connected in series, means for connecting said series-circuit between ground and the driven end of said first inductance and means for connecting the junction of said condenser and said second inductance to one side of said crystal.

4. A crystal filter comprising, in combination, an amplifier having a plate, a control grid and a cathode, a source of signal energies, means for coupling said source to the control grid of said amplifier, a first inductance connected between the plate of said amplifier and the source of the B+ potential, means for grounding the point of B+ potential for signal frequency, a series-circuit comprised of a condenser and a second inductance, means for connecting said series-circuit between said plate and ground, a crystal, means for connecting one side of said crystal to a point between said condenser and said second inductance, a terminating network for said crystal filter, and means for connecting said terminating network between the other side of said crystal and ground.

5. A crystal filter adapted to select a given signal frequency comprising, in combination, an inductance, means for producing a flow of current of the signal frequency through said inductance, a series-circuit comprised of an impedance having a capacitive reactance and another reactive impedance, means for coupling said series-circuit in parallel with said inductance for signal frequencies, said inductance, said capacitive reactance and said other reactive impedance being resonant at the signal frequency, a crystal, a circuit for coupling one side of said crystal to the junction of the reactive impedances of said series-circuit, a terminating network for said crystal, and circuits for connecting said terminating network between the other side of said crystal and one end of said series-circuit.

6. A circuit for producing a continuous signal from a series of bursts of said signal comprising, in combination, an electron discharge device having an anode, a cathode, and a control electrode, a source of direct-current electromotive force having positive and negative terminals, a first inductance connected between said anode and said positive terminal, a direct-current connection between said negative terminal and said cathode, a capacitor and a second inductance connected in series between said anode and said negative terminal, said first and second inductance and said capacitor being of such values as to be resonant at the frequency of the signal, a crystal, a circuit for connecting one side of said crystal to the junction of said capacitor and said second inductance, a terminating network coupled between the other side of said crystal and said negative terminal.

7. A circuit for producing from a series of bursts of a signal a continuous signal wave comprising, in combination, an electron discharge device having an anode, a cathode and a control electrode, a source of direct-current electromotive force having positive and negative terminals, a first iductance and a resistor connected in series and in the order named between said anode and said positive terminal, a direct-current connection between said negative terminal and said cathode, a capacitor connected between said anode and said cathode, a coupling capacitor and a second inductance connected in series in the order named between the junction of said first inductance and said resistor and said negative terminal, said inductances and said capacitors forming a resonant circuit at the frequency of said signal wave, a crystal, means for connecting one side of said crystal to the junction of said coupling capacitor and said second inductance, and a terminating network connected between the other side of said crystal and said negative terminal.

8. A circuit for deriving a continuous wave from a series of bursts comprising, in combination, an electron discharge device having an anode, a cathode and a control electrode, a source of direct-current electromotive force having positive and negative terminals, a first inductance and a resistor connected in the order named between said anode and said positive terminal, a direct-current connection between said cathode and said negative terminal, a first capacitor connected between the junction of said first inductance and said resistor and said negative terminal, a second capacitor connected between said anode and said negative terminal, said capacitors and said first inductance forming a circuit that is resonant at the frequency of the continuous wave, a coupling condenser and a second inductance connected in the order named between the junction of said first inductance and said resistor and said negative terminal, means for tuning said second inductance to parallel resonance at the frequency of the continuous wave, a crystal, a connection between one side of said crystal and the junction of said coupling capacitor and said second inductance, and a terminating network coupled between the other side of said crystal and said negative terminal.

9. A filter circuit comprising, in combination, an electron discharge device having an anode, a cathode and a control electrode, a source of direct-current electromotive force having positive and negative terminals, a first inductance connected between said anode and said positive terminal, a direct-current connection between said cathode and said negative terminal, first and second capacitors connected in series between said anode and said negative terminal, said first inductance and said first and second capacitors forming a circuit that is resonant at a frequency to be selected by the filter, a second inductance connected in parallel with said second capacitor, a third capacitance connected in parallel with said second inductance, the value of said third capacitance being such as to make said second inductance resonant at the selected frequency, a crystal that is resonant at the selected frequency, a connection between one side of said crystal and the junction of said first and second capacitors, and a terminating network connected between the other side of said crystal and said negative terminal.

10. A filter for selecting a particular frequency comprising, in combination, an electron valve, a source of direct-current electromotive force, a first inductance connected in series with said valve and said source, first and second capacitors connected in series in the order named so as to form a series-circuit, connections for placing said series circuit in parallel relationship with said valve, said first inductance and said capacitors forming a circuit that is resonant at the particular frequency, a crystal, means for coupling the junction of said first and second capacitors to one side of said crystal, and a terminating network connected between the other side of said crystal and the side of said second capacitor that is remote from said first capacitor.

References Cited in the file of this patent

UNITED STATES PATENTS

| | | |
|---|---|---|
| 2,001,387 | Hansell | May 14, 1935 |
| 2,005,083 | Hansell | June 18, 1935 |
| 2,308,258 | Armstrong et al. | Jan. 12, 1943 |
| 2,309,602 | Koch | Jan. 26, 1943 |
| 2,509,057 | Guanella | May 23, 1950 |
| 2,742,615 | Presisig | Apr. 17, 1956 |

FOREIGN PATENTS

| | | |
|---|---|---|
| 675,313 | Germany | May 9, 1939 |
| 956,889 | France | Aug. 15, 1949 |